(No Model.) 2 Sheets—Sheet 2.

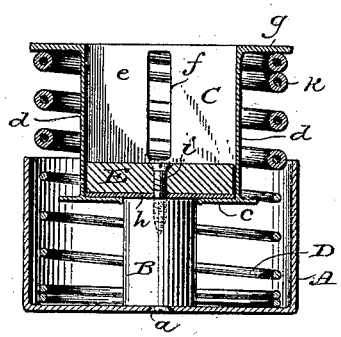

I. RANDALL.
STAMP AFFIXING STAND.

No. 395,172. Patented Dec. 25, 1888.

Fig. 5.

Witnesses
Geo. W. Young
William Klug

Inventor
Isaac Randall
By Stout & Underwood
Attorneys

UNITED STATES PATENT OFFICE.

ISAAC RANDALL, OF MILWAUKEE, WISCONSIN.

STAMP-AFFIXING STAND.

SPECIFICATION forming part of Letters Patent No. 395,172, dated December 25, 1888.

Application filed December 31, 1887. Serial No. 259,484. (No model.)

*To all whom it may concern:*

Be it known that I, ISAAC RANDALL, of Milwaukee, in the county of Milwaukee, and in the State of Wisconsin, have invented certain new and useful Improvements in Stamp-Affixing Stands; and I do hereby declare that the following is a full, clear, and exact description thereof.

My invention relates to devices for affixing postage-stamps to envelopes; and it consists in a stand which combines the functions of a paper-weight with that of a stamp-sticker, all as will be fully set forth hereinafter and pointed out in the claim.

In the drawings, Figure 1 is a vertical central section of the preferred form of my improved device on the line 1 1 of Fig. 2. Fig. 2 is a plan view of said device, partly broken away to better show the construction. Fig. 3 is a perspective view of the stamp-receptacle. Fig. 4 is a vertical central section of the stand proper with the spring removed, and Fig. 5 is a perspective view of the entire device ready for use and with its cover beside it.

My present invention is an improvement on the device patented by me on April 19, 1887, under No. 361,450, and is a neater, cheaper, and more compact form of my device, and one better adapted for desk purposes than are the devices shown in my said prior patent.

In my present invention, A represents the stand proper, which is preferably a round metal box of sufficient weight to serve as a paper-weight, though the shape of said stand and the material of which it is composed are obviously immaterial.

B is a stud or short post rising from the bottom of the stand and which may be made separately therefrom and secured thereto, as by screw $a$, as shown, if desired. The top of this post or stud is below the top of the stand A, and this post or stud B projects through the opening $b$ in the bottom plate, $c$, of the stamp-receptacle C, which has four vertical sides, $d$ $d$ and $e$ $e$, the latter being provided with openings or perforations $f f$, and the receptacle having a horizontal flange, $g$, extending outwardly from the said vertical walls and of a diameter or extent just sufficient to enable it to move closely within the walls of the stand A just below the top thereof when the receptacle C is depressed against the force of the spring D. The spring is preferably a coiled-wire spring, as shown, and the upper half of said coil is covered with any suitable material (by preference rubber tubing $k$) to protect this exposed part of the spring and prevent noise or rattling against the wall of the stand when the said spring is depressed by pressure on the stamp-receptacle C, the spring bearing against the flange $g$ of the said receptacle, as shown in Fig. 1, and the diameter of the plate $c$ of said receptacle C being small enough to permit it to be moved up and down inside the spring-coil D without contact therewith. In order that the receptacle may always move vertically, I provide the guide-block E, which (with an interposed washer or plate, $h$, if desired) is secured to the post or stud B, as by a bolt or screw, $i$, fitting into the screw-threaded perforation $j$ in the top of said post or stud B after the spring D and receptacle C are in place. F is the cover or top of the device.

The operation of my present device is practically the same as that of my patent hereinbefore named, except that, as my present device is not designed to be inverted in use there is no necessity for any stamp-retaining plate, such as is shown in my said patent; but I may use the cover or top F when the device is not in operation to keep the stamps in the receptacle C clean and free from dust and dampness, and obviously this cover may be a simple slip cover, as shown, or may be screwed or hinged to the stand A, if desired. The stamps are placed within the chamber of the receptacle C with their gummed sides uppermost; and to use them it is only necessary to moisten the corner of an envelope and press the same down to cause the top stamp to adhere thereto, the openings $f f$ in the vertical walls of the said receptacle serving to admit air under the envelope and by atmospheric pressure prevent the loose stamps under the one just attached from leaving their position, and the moment pressure is relaxed the force of the spring-coil D, bearing against the under side of the flange $g$ of the receptacle C, will raise it and lift the envelope above the main body of the stamps resting on the guide-block E.

Having thus described my invention, what I claim as new, and desire to secure by Letters Patent, is—

In a stamp-affixing device, the combination of a box or stand having a stud or post rising therefrom to a height less than the height of said stand, a guide-block secured to the top of said post and below the top of said stand, a stamp-receptacle consisting of a slotted bottom plate sliding on said post and having vertical imperforate and alternate perforated walls rising vertically from said plate, said bottom plate being of less diameter than the stand and free from contact therewith, and the said vertical walls being provided with an outwardly-extending upper horizontal flange of a diameter just sufficient to enable it to move within said stand, and a coiled spring bearing against the bottom and sides of the stand and against the under side of said horizontal flange and free from contact with the bottom plate and vertical walls of the stamp-receptacle, substantially as shown and described.

In testimony that I claim the foregoing I have hereunto set my hand, at Milwaukee, in the county of Milwaukee and State of Wisconsin, in the presence of two witnesses.

ISAAC RANDALL.

Witnesses:
H. G. UNDERWOOD,
WILLIAM KLUG.